US007483262B2

(12) United States Patent
Yin et al.

(10) Patent No.: US 7,483,262 B2
(45) Date of Patent: Jan. 27, 2009

(54) COMPUTER SYSTEM WITH MULTIPLE-CONNECTOR APPARATUS

(75) Inventors: Memphis-Zhihong Yin, Tomball, TX (US); Cary J. Hoffer, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 47 days.

(21) Appl. No.: 10/758,386

(22) Filed: Jan. 15, 2004

(65) Prior Publication Data

US 2005/0157459 A1 Jul. 21, 2005

(51) Int. Cl.
*H05K 7/16* (2006.01)
(52) U.S. Cl. ................ 361/683; 361/686; 439/131
(58) Field of Classification Search ............... 361/683, 361/686; 435/131, 502, 946; 439/31, 131
See application file for complete search history.

(56) References Cited

U.S. PATENT DOCUMENTS

| 5,667,395 | A | * | 9/1997 | Okada et al. ............... 439/131 |
|---|---|---|---|---|
| 5,971,777 | A | * | 10/1999 | Garside ...................... 439/131 |
| 5,975,927 | A | * | 11/1999 | Giles ........................... 439/131 |
| 5,982,624 | A | * | 11/1999 | Onoda et al. ............... 361/737 |
| 5,984,731 | A | * | 11/1999 | Laity ........................... 439/676 |
| 6,033,240 | A | * | 3/2000 | Goff ............................ 439/131 |
| 6,064,566 | A | * | 5/2000 | Agata et al. ................ 361/684 |
| 6,093,038 | A | * | 7/2000 | Chen et al. .................. 439/131 |
| 6,097,605 | A | * | 8/2000 | Klatt et al. .................. 361/737 |
| 6,173,405 | B1 | * | 1/2001 | Nagel ......................... 713/200 |
| 6,183,307 | B1 | * | 2/2001 | Laity et al. ................. 439/676 |
| 6,186,803 | B1 | * | 2/2001 | Garside ...................... 439/131 |
| 6,190,182 | B1 | * | 2/2001 | Liebenow et al. ............ 439/74 |
| 6,193,522 | B1 | * | 2/2001 | Liao ............................. 439/31 |
| 6,217,350 | B1 | * | 4/2001 | Johnson et al. ............. 439/131 |
| 6,217,351 | B1 | * | 4/2001 | Fung et al. .................. 439/131 |
| 6,273,735 | B1 | * | 8/2001 | Johnson et al. ............. 439/131 |
| 6,290,517 | B1 | * | 9/2001 | Anderson ................... 439/131 |
| 6,488,542 | B2 | * | 12/2002 | Laity .......................... 439/676 |
| 6,525,932 | B1 | * | 2/2003 | Ohnishi et al. ............. 361/686 |
| 6,536,670 | B1 | * | 3/2003 | Postman et al. ............ 235/487 |
| 6,537,085 | B2 | * | 3/2003 | Na ............................. 439/76.1 |
| 6,561,824 | B1 | * | 5/2003 | Beckham et al. ........... 439/131 |
| 6,863,554 | B1 | * | 3/2005 | Glad ........................... 439/344 |
| 2002/0167793 | A1 | * | 11/2002 | Branch et al. .............. 361/686 |

OTHER PUBLICATIONS

"3Com 802.11b with XJACK," Fresh Gear, TechTV, web page http://www.techtv.com/freshgear/products/story/0,23008,3358870,00.html.

* cited by examiner

*Primary Examiner*—Jayprakash N Gandhi
*Assistant Examiner*—Ingrid Wright

(57) ABSTRACT

A computer system comprises a multiple-connector apparatus. The multiple-connector apparatus can be retracted into the computer system.

12 Claims, 4 Drawing Sheets

COMPUTER SYSTEM WITH MULTIPLE-CONNECTOR APPARATUS

BACKGROUND

Computer systems, such as notebook and desktop personal computers, have a certain number of port connectors for connection to external devices, such as printers, scanner, keyboards, pointing devices, cameras and many others. Since the devices are external to the computer systems, the port connectors are externally accessible. The external area of the computer systems has a finite amount of space for only a certain number of port connectors. However, there has been an almost unending proliferation of the number and types of devices that may be connected to the computer systems. To accommodate the increasing number of devices that may be connected to the computer systems, computer makers have attempted to increase the number of port connectors that are available in the computer systems.

One way to increase the number of port connectors is to increase the size of the housing for the computer system, so there is more external area for the port connectors. However, there are limitations on the acceptable footprint size of computer systems. Notebook computers, for instance, must by definition be relatively small. Additionally, desktop computers are expected not to take up too much space on or under a user's workspace.

Another way to increase the number of port connectors is to decrease the size of the port connectors, so more connectors can fit along the external area of the computer system. The Universal Serial Bus (USB) and IEEE 1394 standards, for example, were specifically developed in part to use relatively small port connectors. However, the strength of materials for the port connectors and the quality of electrical signals passing through the port connectors place effective physical limits on reductions in the size of the port connectors.

Another way to increase the number of port connectors is to use more of the available external area of the computer systems. In particular, desktop computers, which have historically included port connectors only in the back of the computer housing, have begun to include additional port connectors on the front of the computer housing. Regardless, the available surface area is still limited.

Another way to increase the number of port connectors is for a user to insert into the computer system one or more additional cards having additional port connectors. For example, a PCI (Peripheral Component Interconnect) card, or other circuit board, having one or more port connectors may be inserted by a user into an available slot in a desktop computer system, so that the port connectors are externally accessible. Similarly, a PC Card or PCMCIA (Personal Computer Memory Card International) card having a port connector (or that is a port connector) may be inserted by a user into an available slot in a notebook computer. PC Cards having "Xjack" features, for example, have been used to add modem and network port connectors to notebook computers. The additional cards, however, use up slots that are not then available for other devices. Furthermore, the additional cards are independent from the computer system and are another item to be carried by the user.

Another way to increase the number of port connectors is to use an external port "hub." The port hub provides multiple port connectors for multiple devices, but connects to only one port connector in the computer system. Thus, the port hub effectively "splits" the existing port connector in the computer system into more than one port connector. The port hub, however, takes up a portion of the user's workspace and adds to the number of items that a mobile user must carry.

SUMMARY OF THE INVENTION

According to a particular embodiment of the present invention, a computer system comprises a retractable multiple-connector apparatus.

According to another embodiment of the present invention, a computer system comprises a sidewall and a multiple-connector apparatus. The sidewall has an aperture therethrough. The multiple-connector apparatus is disposed to pass at least partially through the aperture. The multiple-connector apparatus can be positioned in a retracted position to conceal at least one of the connectors inside the computer system and in an extended position in which at least one of the connectors is accessible outside of the computer system.

Additionally, according to yet another embodiment, a computer system comprises a housing means and a means for changing a total number of port connectors exposed outside of the housing means. The housing means has an aperture. The changing means enables a plurality of the port connectors to move back and forth through the aperture.

DETAILED DESCRIPTION

Figure 1:
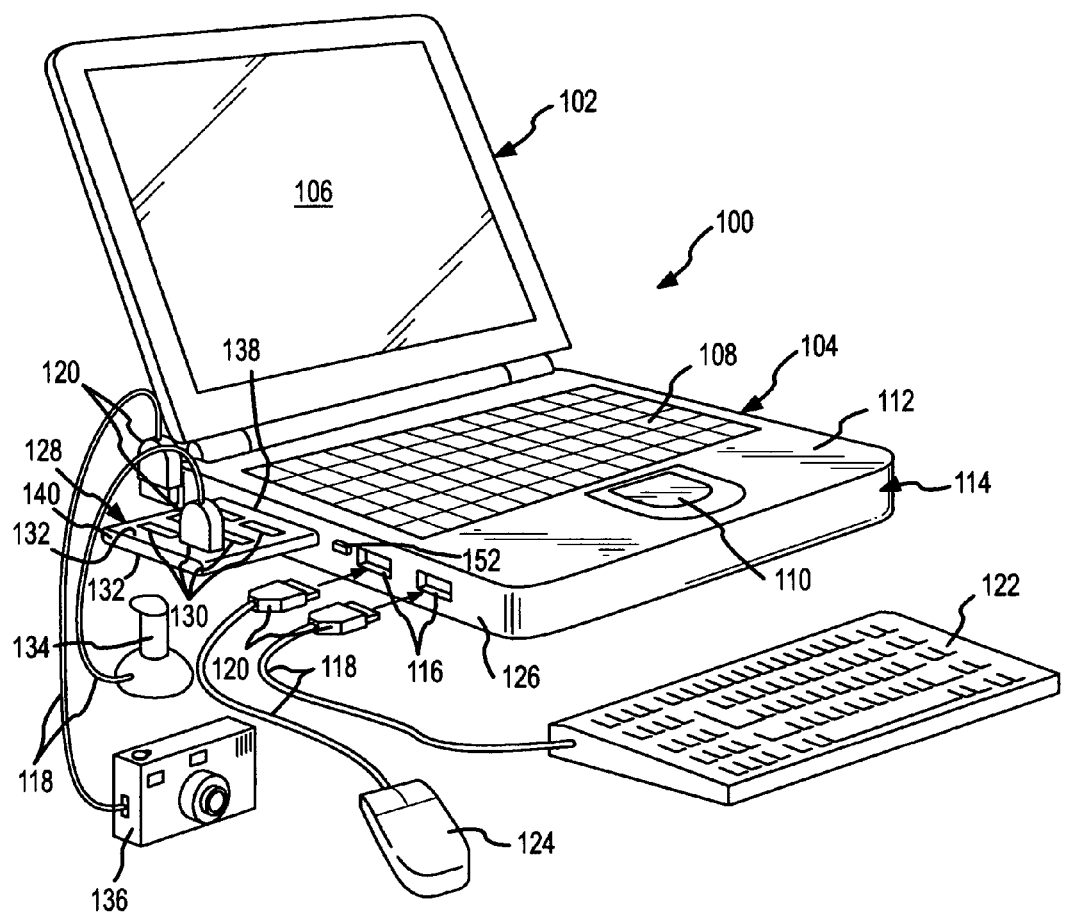
FIG. 1 is a perspective view of a computer system incorporating an embodiment of the present invention in a first configuration.

An exemplary computer system 100 incorporating an embodiment of the present invention is shown in FIG. 1. Although the invention is described with reference to the computer system 100, which system 100 is shown as a notebook PC, the invention is not so limited, but may also be incorporated in any other type of electronic device that has external connectors, such as a desktop PC, a computer server, a mainframe computer, a handheld computer, a personal digital assistant (PDA), an electronic tablet, a communication bridge, router or gateway, a video gaming system, an audio/video player, a television, a home entertainment system, etc. The computer system 100 includes a display section 102 and a base section 104. The display section 102 includes a display screen 106. The base section 104 includes a keyboard 108 and a pointing device 110 exposed in a top side 112 of a housing 114. The base section 104 also preferably includes most of the electronic components of the computer system 100.

The base section 104 optionally includes various port connectors 116, such as Universal Serial Bus (USB) connectors, IEEE 1394 connectors, etc. The port connectors 116 are for connecting, via cables 118 and plugs 120, to external peripheral devices, such as an external keyboard 122 and an external pointing device 124, among others. The port connectors 116 may be located at any appropriate position in the computer system 100, but are preferably fixed in a sidewall 126 of the housing 114 of the base section 104. The port connectors 116, thus, cannot be moved, are always accessible from the outside of the housing 114 and take up a fixed amount of the area of the sidewall 126.

The base section 104 also includes a multiple-connector apparatus 128. The multiple-connector apparatus 128 is preferably a "deck" or "tray" that includes multiple port connectors 130 (e.g. for serial ports, parallel ports, proprietary ports, expansion ports, USB ports, IEEE 1394 ports, etc.) arranged in at least one side 132 thereof. The port connectors 130 are for connecting, via cables 118 and plugs 120, to additional external peripheral devices, such as a game controller 134 and a digital camera 136, as shown, or a communication device, a printer, a scanner, an expansion device, a port replicator, etc. The multiple-connector apparatus 128 may be located at any appropriate position in the computer system 100. The multiple-connector apparatus 128 is preferably able to protrude through an aperture, or opening, 138 in the housing 114. In the example shown, the aperture 138 is in the sidewall 126. Thus, the multiple-connector apparatus 128 can extend to an extended position, as shown by a first configuration in FIG. 1, and retract to a retracted position, as shown by a second configuration in FIG. 2.

With the multiple-connector apparatus 128 in the retracted position, the computer system 100 can connect to external devices (e.g. keyboard 122 and pointing device 124) only through the optional fixed port connectors 116. With the multiple-connector apparatus 128 in the extended position, the computer system 100 can connect to additional external devices (e.g. game controller 134 and digital camera 136). Thus, the use of the multiple-connector apparatus 128 enables a user to increase or decrease the number of externally accessible port connectors of, and the number of external devices connected to, the computer system 100, depending on the needs of the user.

In the example shown, the user can change the number of accessible port connectors 116 and 130 between two and eight, since there are two fixed port connectors 116 in the sidewall 126 and six port connectors 130 in the multiple-connector apparatus 128. However, the invention is not so limited. Rather, any appropriate number of the fixed port connectors 116 and the port connectors 130 in the multiple-connector apparatus 128 may be used to provide a variety of ranges for the number of accessible port connectors 116 and 130.

In the particular embodiment shown, the sidewall 126 is substantially perpendicular to the sides 132. Additionally, the port connectors 130 are arranged in a plane substantially parallel to the sides 132. The port connectors 130 are thus adapted to receive mating connectors, or plugs 120, in a direction substantially parallel to the sidewall 126.

The area of an outer face 140 of the multiple-connector apparatus 128 and the surrounding aperture 138 in the sidewall 126 is smaller than the area of the sides 132 of the multiple-connector apparatus 128, in which the port connectors 130 are arranged. Therefore, the area of the sidewall 126 occupied by the multiple-connector apparatus 128 and the fixed port connectors 116 combined is relatively small considering the total number of port connectors 116 and 130 that are available in the computer system 100.

Without changing the amount of the area of the sidewall 126 occupied by the multiple-connector apparatus 128, the number of additional port connectors 130 is primarily limited only by a practical length for the multiple-connector apparatus 128. The practical length for the multiple-connector apparatus 128 is affected by the strength of the materials thereof and the arrangement of any other components in the base section 104.

Figure 3:
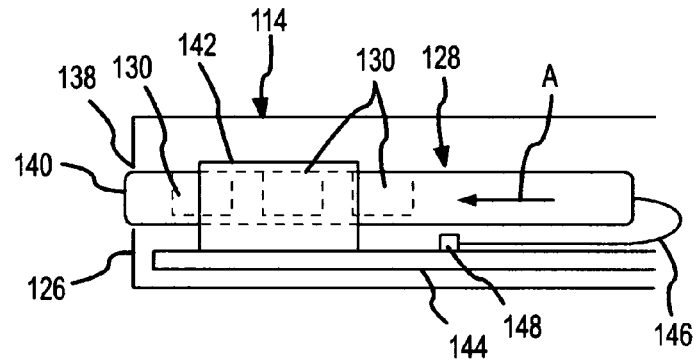
FIGS. 3-6 are side views of a portion of the computer system shown in FIGS. 1 and 2 with an embodiment of a multiple-connector apparatus.
Figure 4:
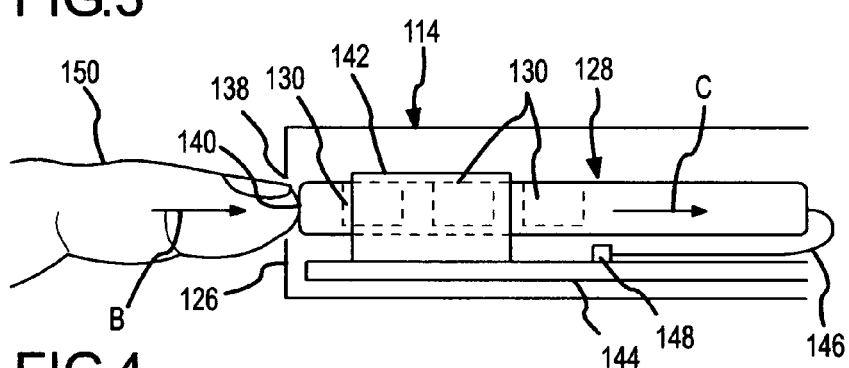
Figure 5:
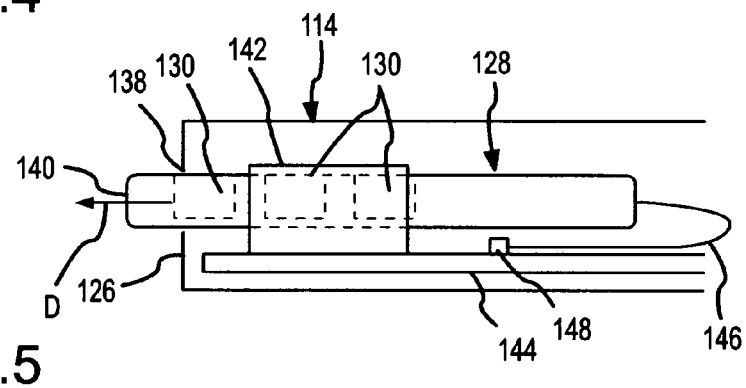
Figure 6:
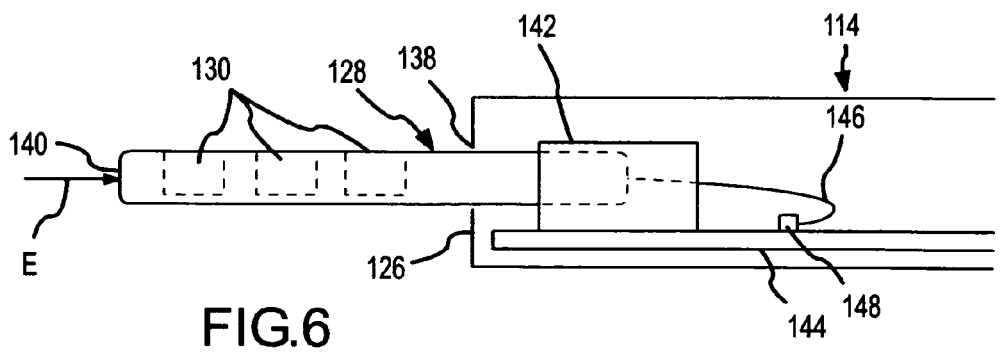

A method of and mechanism for extending and retracting the multiple-connector apparatus 128 is illustrated by FIGS. 3-6. The retracted and extended positions are shown in FIGS. 3 and 6, respectively. Transitional positions are shown in FIGS. 4 and 5.

In the retracted position, as shown in FIG. 3, the multiple-connector apparatus 128 is almost fully disposed within the housing 114. Only the outer face 140 of the multiple-connector apparatus 128 is exposed outside of the housing 114 through the aperture 138 in the sidewall 126. The port connectors 130 are inaccessible from the exterior of the housing 114 when the multiple-connector apparatus 128 is in the retracted position.

In the extended position, as shown in FIG. 6, the port connectors 130 are exposed and accessible outside the housing 114. A portion of the multiple-connector apparatus 128 remains inside the housing 114 to anchor and stabilize the multiple-connector apparatus 128.

An extension/retraction mechanism 142 preferably holds the multiple-connector apparatus 128 in each of the positions shown in FIGS. 3-6. The extension/retraction mechanism 142 is mounted inside the housing 114 in any appropriate manner, such as by being tethered or otherwise connected to a printed circuit board 144, such as a "motherboard." The multiple-connector apparatus 128 extends and retracts through the extension/retraction mechanism 142.

In the retracted position, the extension/retraction mechanism 142 preferably locks the multiple-connector apparatus 128 in place, so the multiple-connector apparatus 128 does not inadvertently slide out of the housing 114. In the extended position, the extension/retraction mechanism 142 either locks the multiple-connector apparatus 128 in place or enables it to slide freely. In the transitional positions, the extension/retraction mechanism 142 preferably enables the multiple-connector apparatus 128 to slide freely.

A cable 146, such as a flexible ribbon cable, and a connector 148 mounted on the printed circuit board 144 electrically connect the multiple-connector apparatus 128 to the printed circuit board 144. The multiple-connector apparatus 128 has circuitry for electrically connecting the port connectors 130 to the cable 146. The printed circuit board 144 includes electronics that control electrical signals between the printed circuit board 144 and the port connectors 130. The multiple-connector apparatus 128 may include additional circuitry that splits signal lines from the cable 146 to each of the port connectors 130 in a manner similar to a port hub.

The extension/retraction mechanism 142 may operate in a variety of ways, not limited to the following examples. In a particular embodiment, the extension/retraction mechanism 142 preferably operates as a "push-push" mechanism. The multiple-connector apparatus 128 is thus spring-biased by the extension/retraction mechanism 142 in the direction of arrow A, but also held in the retracted position shown in FIG. 3 by the extension/retraction mechanism 142. To extend the multiple-connector apparatus 128 from the retracted position, the user pushes on the multiple-connector apparatus 128 (e.g. with a finger 150) in the direction of arrow B, as shown in FIG. 4. Movement of the multiple-connector apparatus 128 in the direction of arrow C to the intermediate position, shown in FIG. 4, causes the extension/retraction mechanism 142 to release the multiple-connector apparatus 128. Therefore, when the user releases the finger pressure, the multiple-connector apparatus 128 springs outward in the direction of arrow D at least to a partially extended intermediate position, such as that shown in FIG. 5. The multiple-connector apparatus 128 can then be pulled either the remainder of the distance to the extended position shown in FIG. 6 or only far enough to expose as many of the port connectors 130 as are desired for operational usage. To return the multiple-connector apparatus 128 to the retracted position, the user pushes on the multiple-connector apparatus 128 in the direction of arrow E until the multiple-connector apparatus 128 locks in the retracted position.

In another particular embodiment, the extension/retraction mechanism 142 preferably operates to push the multiple-connector apparatus 128 in the direction of arrow D when the user presses an actuator button 152 (FIGS. 1 and 2) in the direction of arrow F. The multiple-connector apparatus 128 either "pops" out under the force of the button press or is driven out by an electrical motor at least partially through the aperture 138, such as to the intermediate position shown in FIG. 5.

Figure 7:
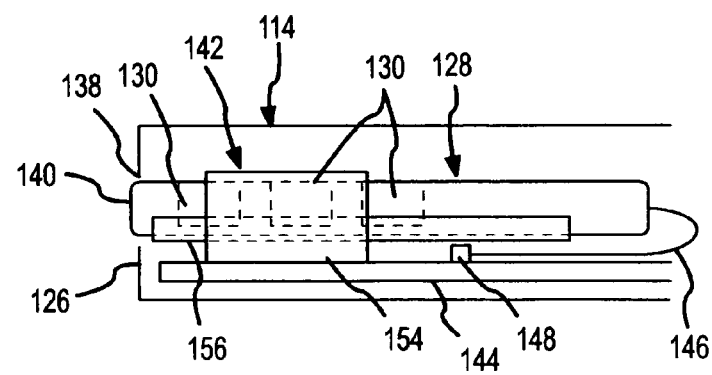
FIGS. 7 and 8 are side views of a portion of the computer system shown in FIGS. 1 and 2 with another embodiment of a multiple-connector apparatus.
Figure 8:
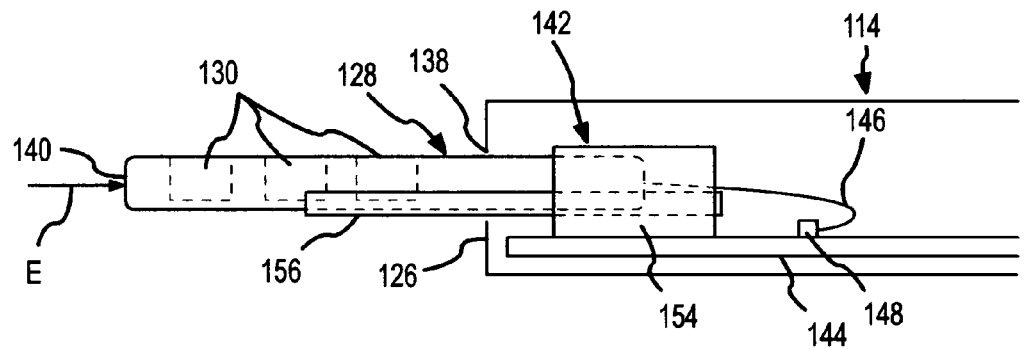

In another particular embodiment, the extension/retraction mechanism 142 preferably includes a mounted portion 154 and a sliding tray 156, as shown in FIGS. 7 and 8. The sliding tray 156 holds the multiple-connector apparatus 128, and the mounted portion 154 holds the sliding tray 156. The multiple-connector apparatus 128 moves relative to the sliding tray 156 and the sliding tray 156 moves relative to the mounted portion 154 in a telescopic manner between the retracted position shown in FIG. 7 and the extended position shown in FIG. 8. The sliding tray 156 provides additional stability and strength for holding the multiple-connector apparatus 128. Also, in a particular embodiment, the extension/retraction mechanism 142 is preferably motorized, so that upon pressing the actuator button 152 (FIGS. 1 and 2), the sliding tray 156 and the multiple-connector apparatus 128 transition between the extended and retracted positions.

Figure 2:
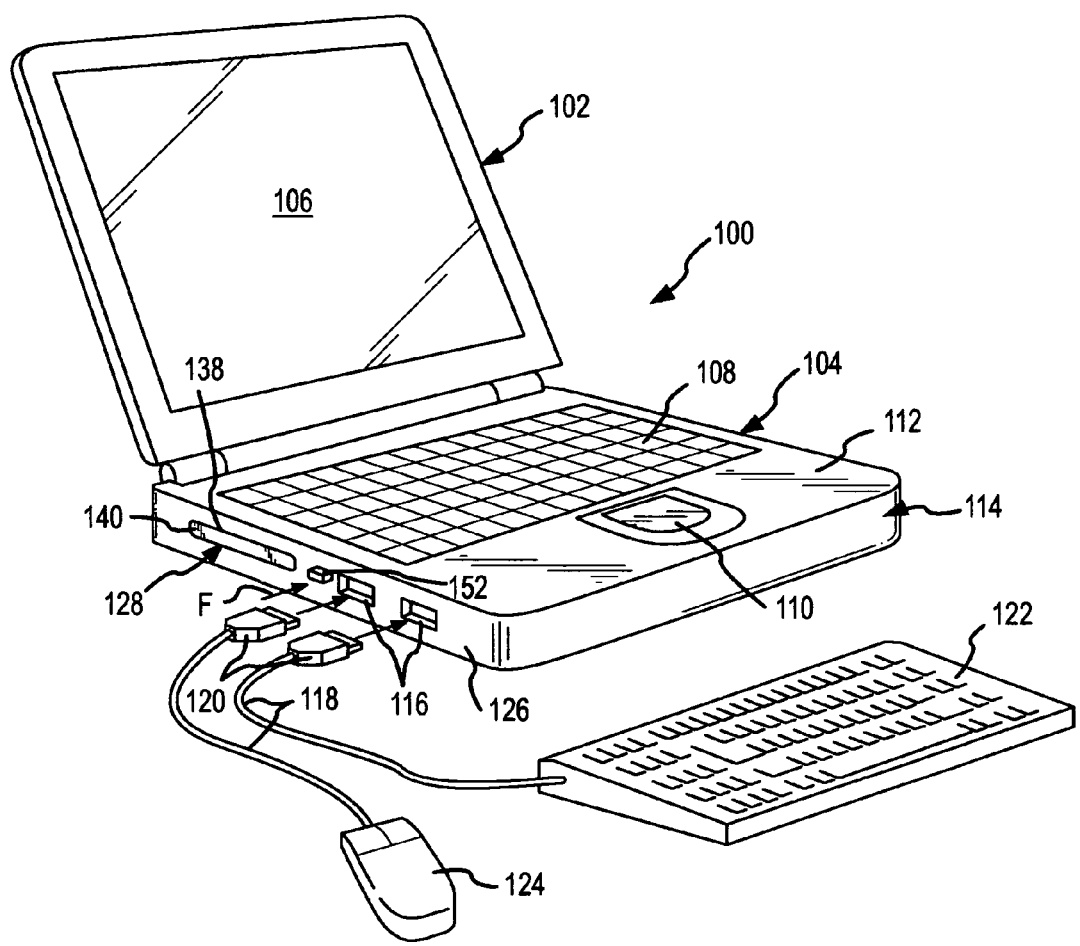
FIG. 2 is a perspective view of the computer system shown in FIG. 1 in a second configuration.
Figure 9:
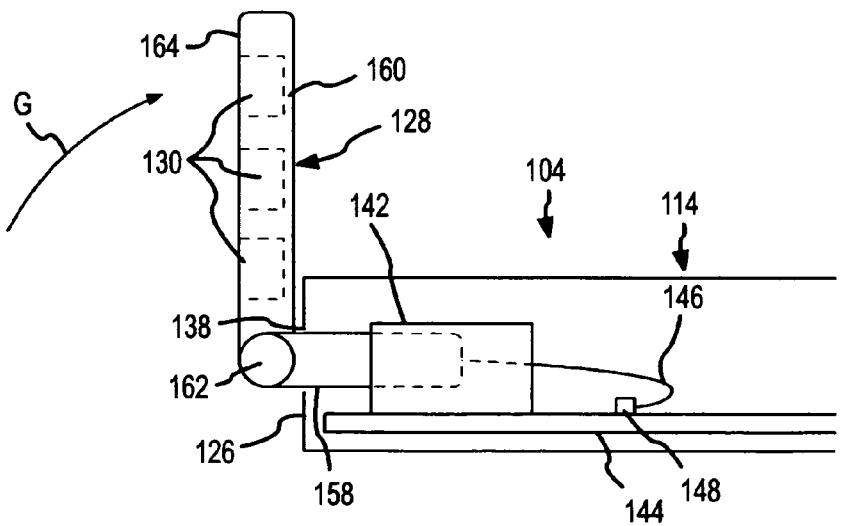
FIG. 9 is a side view of a portion of the computer system shown in FIGS. 1 and 2 with yet another embodiment of a multiple-connector apparatus.

In another particular embodiment, the multiple-connector apparatus 128 preferably includes a base portion 158 and a hinged, or pivoting, portion 160 connected by a hinge 162, as shown in FIG. 9. In this embodiment, the hinged portion 160 can pivot on the hinge 162 in the direction of arrow G to an upward, or vertical, position, as shown, or to any obliquely angled position, when the multiple-connector apparatus 128 has been extended. In this position, the port connectors 130 are preferably accessible from a side 164 facing away from the base section 104, so the cables 118 do not protrude over the base section 104 and get in the way of the keyboard 108 (FIGS. 1 and 2). It will be appreciated, however, that the connectors 130 can be made accessible from either side of the hinged portion 160. The hinged portion 160 is pivoted down to a horizontal position in order to retract the multiple-connector apparatus 128 back inside the housing 114. In this embodiment, the multiple-connector apparatus 128 does not employ as much horizontal space as do the embodiments shown in FIGS. 6 and 8.

We claim:

1. A port connector mechanism for use in a computer system comprising:
   a connector tray having first and second portions pivotably connected together;
   a plurality of port connectors disposed in the second portion of the connector tray; and
   an extension/retraction mechanism that locks the first and second portions in a retracted position until released therefrom and enables the released first and second portions to extend to an extended position, wherein the second portion pivots relative to the first portion when the first and second portions are released and in the extended position.

2. A port connector mechanism as defined in claim 1 wherein:
   the extension/retraction mechanism comprises a push-push mechanism.

3. A port connector mechanism as defined in claim 1 further comprising:
   an actuator button that, upon activation, causes the extension/retraction mechanism to release the connector tray from the retracted position.

4. A method for changing a number of accessible port connectors of a computer system comprising:
   providing the computer system with a multiple-connector tray with first and second portions in a retracted position relative to a housing of the computer system, the multiple-connector tray having plural connectors in the second portion inaccessible in the retracted position;
   extending the multiple-connector tray to an extended position relative to the housing to expose the second portion; and
   pivoting the second portion relative to the first portion when the multiple-connector tray is in the extended position to render the plural connectors accessible.

5. A method as defined in claim 4 further comprising:
   releasing the multiple-connector tray from the retracted position.

6. A method as defined in claim 4 further comprising:
   retracting the multiple-connector tray back to the retracted position.

7. A computer system, comprising:
   a retractable multiple-connector apparatus that is mounted inside an aperture of the computer system and not detachable from the computer system wherein the multiple-connector apparatus is push activated to eject through the aperture to expose multiple connectors for simultaneously connecting plural peripheral devices;
   a housing; and
   wherein the multiple-connector apparatus has a first portion and a second portion, the second portion pivots relative to the housing upon being extended from the housing.

8. A computer system as defined in claim 7 and wherein the retractable multiple-connector apparatus is integrated with the housing.

9. A computer system as defined in claim 7 wherein:
   the retractable multiple-connector apparatus retracts entirely into the computer system.

10. A computer system as defined in claim 7 and wherein the retractable multiple-connector apparatus retracts within the housing to a position at which a remote side of the retractable multiple-connector apparatus is flush with a wall of the housing.

11. A computer system as defined in claim 7 wherein:
    the second portion of the retractable multiple-connector apparatus pivots to a vertical position relative to the housing.

12. A computer system as defined in claim 11 wherein:
    the retractable multiple-connector apparatus further comprises a plurality of connectors accessible from a side away from the housing of the computer system.

* * * * *